United States Patent [19]

Ortner et al.

[11] 4,360,402

[45] Nov. 23, 1982

[54] PROCESS AND APPARATUS FOR PREPARING WASTE PAPER FOR REUSE

[75] Inventors: Herbert Ortner; Lother Pfalzer; Siegbert Fischer, all of Heidenheim, Fed. Rep. of Germany

[73] Assignee: J. M. Voith GmbH, Heidenheim, Fed. Rep. of Germany

[21] Appl. No.: 24,412

[22] Filed: Mar. 27, 1979

[51] Int. Cl.³ .............................................. D21C 5/02
[52] U.S. Cl. ........................................ 162/5; 162/29; 210/703; 210/712; 210/806; 210/928; 210/195.1
[58] Field of Search .................. 162/4, 5, 29; 210/44, 210/221 R, 221 M, 221 P, 5, 29, 703, 712, 806, 928, 195.1

[56] References Cited

U.S. PATENT DOCUMENTS 3,994,770 11/1976 Lausch ................................... 162/5

FOREIGN PATENT DOCUMENTS

| 699582 | 12/1964 | Canada | 162/5 |
| 2311674 | 9/1974 | Fed. Rep. of Germany | 162/5 |
| 52-20563 | 6/1977 | Japan | 162/5 |

Primary Examiner—William F. Smith
Attorney, Agent, or Firm—Albert L. Jeffers; John F. Hoffman

[57] ABSTRACT

A process and apparatus for preparing waste paper for reuse in a paper machine. Waste paper, water and de-inking chemicals are introduced to coarse pulping apparatus, and the coarsely pulped stock suspension is then thickened by filtration and treated in a reaction tower. The pulp is then thinned and passed through flotation apparatus to remove separated impurities, particularly printing inks. Water removed from the pulp in the thickening operation is passed through second flotation apparatus with the clean water therefrom being reintroduced to the apparatus.

6 Claims, 1 Drawing Figure

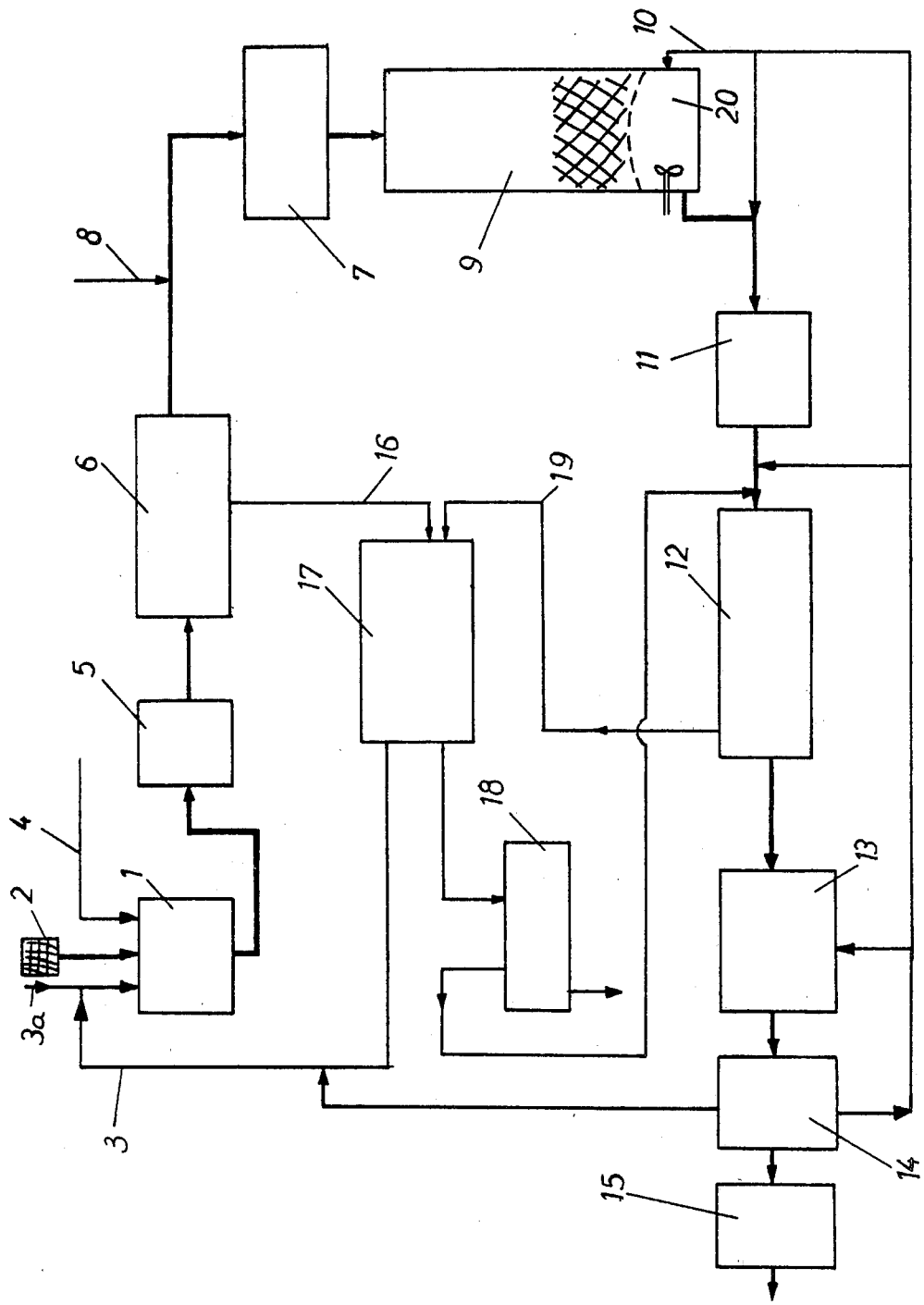

PROCESS AND APPARATUS FOR PREPARING WASTE PAPER FOR REUSE

BACKGROUND OF THE INVENTION

1. Field of the Invention

This invention relates generally to a process and apparatus for preparing waste paper for reuse in a a paper machine, of the type including coarse pulping in a pulper, preliminary sorting, thickening to stock densities of more than 10%, treatment in a reaction tower in the presence of de-inking chemicals, followed by thinning of the suspension and flotation in flotation apparatus.

2. Description of the Prior Art

A process and apparatus of the type described above is disclosed, for instance, in German Laid-open patent specification DE-OS No. 2 311 674. In that process and apparatus, the de-inking chemicals are introduced to the pulp shortly before the reaction or bleaching tower, only chemicals used as sequestering agents being added in the pulper. With this process and apparatus, although a relatively high level of whiteness is obtained in the re-made paper, it is desirable to achieve still higher levels of paper whiteness.

SUMMARY OF THE INVENTION

According to one aspect of the invention employed in a process of the type referred to above, at least some of the de-inking chemicals are introduced in the pulper, and the water laden with printing inks which is yielded during the thickening process before the reaction tower is subjected to flotation in auxiliary flotation apparatus, clean water obtained from that apparatus being reintroduced into the process.

It has been found that with the use of the invention, a higher level of paper whiteness is achieved when de-inking chemicals are introduced directly at the pulper. This enables the breaking-down of the printing inks on the waste paper to begin in the pulper, rather than only in the reaction tower. However, the result of this early addition of de-inking chemicals is that the water yielded during the thickening process before the reaction tower contains a very considerable amount of printing ink. Thus, the suspension is increasingly loaded with the printing inks since the water from the thickening filter is recycled in order to effect a saving. This could lead to the separated ink being rubbed back into the pulp fibers, in which case the thickening filter would become soiled and the treatment process upset.

By providing an additional, auxiliary flotation apparatus in accordance with the invention, the particles of printing ink which have already been detached by the thickening filter are now removed, so that the recycling circuit cannot become loaded with separated ink particles and, in this way, a higher level of paper whiteness can be obtained without substantial additional expense. The dirt separated out in the auxiliary flotation apparatus, particularly the particles of printing ink, no longer forms ballast for the reaction tower and thus also no longer reaches the flotation apparatus in the main circuit. Thus, the number of compartments in the main flotation apparatus can be reduced, so that the total number of flotation compartments contained in the main and auxiliary flotation apparatuses together need not be greater than in prior apparatus. Since the particles of printing ink occur in concentrated form in the auxiliary flotation apparatus, the efficiency of the flotation process is even increased so that, in addition to a higher level of paper whiteness, a saving of chemicals can be achieved.

As a further development of a process according to the invention, provision is made for the froth from the main flotation apparatus which follows after the reaction tower to be introduced into the auxiliary flotation apparatus for after-treatment.

According to another aspect of the invention applied to apparatus for carrying out the process using a pulper, a thickening filter, a supply line for de-inking chemicals, a reaction tower with a thinning zone in its lower region, and with a flotation apparatus following after the reaction tower, the pulper is provided with a supply line for de-inking chemicals, and auxiliary flotation apparatus is provided in the recycling circuit for the water which is yielded by the thickener.

In accordance with a further aspect of the apparatus according to the invention, provision is made for the froth extraction line from the main flotation apparatus which follows the reaction tower to feed into the auxiliary flotation apparatus.

A further advantage is obtained according to the invention by providing a centrifuge for the froth which arises in the auxiliary flotation apparatus, a return line being provided for reintroducing clean water yielded by the centrifuge into the system.

An object of the present invention is to provide an improved process and apparatus for preparing waste paper for reuse in a paper machine, whereby a higher level of paper whiteness can be achieved without significantly increased outlay.

In order that the invention will be readily understood, one example of a process in accordance therewith will now be described in more detail with reference to the accompanying diagrammatic drawing.

BRIEF DESCRIPTION OF THE DRAWING

The single drawing FIGURE schematically illustrates the apparatus of the invention.

DESCRIPTION OF THE PREFERRED EMBODIMENT

Referring to the drawing, waste paper 2, which may be in the form of bales, is introduced into coarse pulper apparatus 1. At the same time, filtration water is added by a line 3, fresh water by line 3a, and de-inking chemicals and, if desired, other chemicals are added by a supply line 4. The coarsely pulped stock then passes into cleaning and sorting device 5 which may be of the type described in the German specification DE-OS No. 2 514 162, for example. The pulp suspension is then thickened by extracting water therefrom to give a value of more than 10% stock density, preferably around 20%, on a belt pressure filter 6. After this, the suspension, thus thickened, passes into a chemical mixer 7, further de-inking chemicals, such as peroxide, for example, being added either previously or simultaneously by a line 8. After appropriate mixing of the chemicals and the suspension in the mixer 7, the pulp passes into a reaction tower 9, in which it remains, preferably for one to three hours at a stock density of approximately 20%. After thinning in lower thinning zone 20 of tower 9 to approximately 4% by the addition of water by line 10, the pulp leaves the reaction tower 9 and after passing through a deflaker 11, arrives at main flotation apparatus 12. After having been freed from impurities, particularly from printing inks, the pulp is subjected to fine sorting in sorter 13, and is then thickened in thickening apparatus 14 to give values between 6 and 25% dry content, after which it is transported further to the paper machine (not shown), after bleaching in bleaching apparatus 15 if desired. The filtration water yielded in the thickener 14 is conducted back into the line 10 (and if desired, into line 3 as well).

The water laden with printing inks and other dirt particles which is yielded by the belt pressure filter 6 is supplied by a line 16 to a recycling circuit auxiliary flotation apparatus 17, from whence the cleaned water is conducted back into the line 3. The froth from the auxiliary flotation apparatus 17 is supplied to a centrifuge 18 in which the soil is separated out and the water recovered is supplied to the main flotation apparatus 12. If desired, the water yielded in the centrifuge 18 may also be introduced at other points in the process system. The froth from the main flotation apparatus 12 is supplied by line 19 to the auxiliary flotation 17 for re-flotation.

While there have been described above the principles of this invention in connection with specific apparatus, it is to be clearly understood that this description is made only by way of example and not as a limitation to the scope of the invention.

What is claimed is:

1. In a process for preparing waste paper for reuse in a paper machine comprising the steps of introducing water and waste paper to a pulper and coarse pulping therein, thickening the pulp suspension to stock densities of more than 10% by filtration and thereby separating waste water from the thickened pulp suspension, treating the thickened pulp suspension in a reaction tower in the presence of de-inking chemicals followed by thinning of the suspension, and separation of inks from the suspension by flotation in flotation apparatus; the improvement comprising introducing at least some of the de-inking chemicals in the pulper so that the waste water from the thickening step contains ink particles, and subsequently processing the ink particle containing waste water independent of the processing of the thickened pulp suspension by separating particles of ink from the water yielded during said thickening step by flotation in auxiliary flotation apparatus, and reintroducing into the process the clean water obtained from said auxiliary flotation apparatus.

2. A process according to claim 1 comprising the further step of introducing the froth obtained from said first-named flotation apparatus into said auxiliary flotation apparatus for after-treatment.

3. A process according to claim 1 or claim 2 comprising the further steps of centrifuging the froth obtained from said auxiliary flotation apparatus, and reintroducing into the process the clean water obtained from said centrifuging step.

4. Apparatus for preparing waste paper for reuse in a paper machine comprising means for pulping the waste paper to form a pulp suspension, means for thickening the pulp suspension thereby separating waste water from the thickened pulp suspension, means for reacting the thickened pulp suspension with de-inking chemicals and thereafter thinning the suspension, and means for separating ink particles from the suspension by flotation; the improvement comprising means for introducing de-inking chemicals in said pulping means, auxiliary means for subsequently independently processing the waste water by separating by flotation ink particles from the water yielded by said thickening means, and means for reintroducing clean water from said auxiliary separating means into the apparatus.

5. Apparatus according to claim 4 further comprising means for extracting froth from said first-named separating means and introducing the same into said auxiliary separating means.

6. Apparatus according to claims 4 or 5, further comprising means for centrifuging the froth from said auxiliary separating means, and means for reintroducing clean water from said centrifuging means into the apparatus.

* * * * *